(12) United States Patent
Okubo et al.

(10) Patent No.: US 11,231,485 B2
(45) Date of Patent: Jan. 25, 2022

(54) SENSOR AXIS ADJUSTMENT DEVICE AND SENSOR AXIS ADJUSTMENT METHOD

(71) Applicant: HONDA MOTOR CO., LTD., Tokyo (JP)

(72) Inventors: Michiaki Okubo, Tochigi (JP); Kenichiro Kurai, Tochigi (JP); Kazuyuki Fukamachi, Tochigi (JP); Yasuhiro Okuno, Tochigi (JP); Kazumori Sakai, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 160 days.

(21) Appl. No.: 16/577,139

(22) Filed: Sep. 20, 2019

(65) Prior Publication Data

US 2020/0096605 A1 Mar. 26, 2020

(30) Foreign Application Priority Data

Sep. 25, 2018 (JP) .............................. JP2018-178948

(51) Int. Cl.
*G01S 7/40* (2006.01)
*G01S 13/931* (2020.01)

(52) U.S. Cl.
CPC .......... *G01S 7/4021* (2013.01); *G01S 13/931* (2013.01)

(58) Field of Classification Search
CPC .......... G01B 11/2755; G01B 2210/306; G01S 13/867; G01S 13/931; G01S 7/4021; G01S 7/4086
See application file for complete search history.

(56) References Cited

U.S. PATENT DOCUMENTS

| 2002/0105456 | A1* | 8/2002 | Isaji ...................... | G01S 7/4052 342/165 |
| 2016/0377701 | A1* | 12/2016 | Kim ...................... | G01S 7/4052 342/70 |
| 2017/0212215 | A1* | 7/2017 | Hellinger .............. | G01S 13/931 |
| 2018/0299533 | A1* | 10/2018 | Pliefke .................. | G01S 7/40 |
| 2019/0056479 | A1* | 2/2019 | Park ...................... | G01S 17/02 |
| 2019/0107602 | A1* | 4/2019 | Kitamura .............. | G01S 13/931 |
| 2019/0391233 | A1* | 12/2019 | Park ...................... | G01S 7/403 |
| 2020/0064442 | A1* | 2/2020 | Park ...................... | G01S 7/40 |

FOREIGN PATENT DOCUMENTS

| JP | 2005-331353 | 12/2005 |
| JP | 2017-009574 A | 1/2017 |

* cited by examiner

*Primary Examiner* — Timothy X Pham
(74) *Attorney, Agent, or Firm* — Rankin, Hill & Clark LLP (57) ABSTRACT

The optical axis adjustment system 3 adjusts an optical axis O of a radar device R in a vehicle V in which the radar device R that detects an external environment is attached to a vehicle body B, and includes an adjustment target T that is movable in an inspection chamber Rb in which the vehicle body B is disposed, a radar attachment position and direction calculation unit that calculates an attachment position of the radar device R and a direction of the optical axis, a normal posture calculation unit that calculates a normal posture of the adjustment target T on the basis of a calculation result of the radar attachment position and direction calculation unit, and a target movement unit that sets a posture of the adjustment target T to a normal posture.

3 Claims, 10 Drawing Sheets

SENSOR AXIS ADJUSTMENT DEVICE AND SENSOR AXIS ADJUSTMENT METHOD

This application is based on and claims the benefit of priority from Japanese Patent Application No. 2018-178948, filed on 25 Sep. 2018, the content of which is incorporated herein by reference.

BACKGROUND OF THE INVENTION

Field of the Invention

The present invention relates to a sensor axis adjustment device and a sensor axis adjustment method. More specifically, the invention relates to a sensor axis adjustment device and a sensor axis adjustment method for adjusting a sensor axis of an external environment sensor attached to a vehicle.

Related Art

To realize a driving support function or an automatic driving function such as adaptive cruise control and an automatic brake system, an external environment sensor such as a radar device and a camera which detect an external environment is mounted on a vehicle. Particularly, the radar device has strong directivity, and thus it is necessary to attach the radar device in an appropriate direction with respect to a vehicle body to allow the driving support function or the automatic driving function to be appropriately exhibited. According to this, a manufacturing and inspection process of a vehicle on which the radar device is mounted includes an aiming process of adjusting an optical axis of the radar device attached to the vehicle body.

In the aiming process, for example, a target is installed at a predetermined position at the periphery of the vehicle provided in an inspection area. In addition, an electromagnetic wave is emitted from the radar device to the target, and an intensity distribution of the electromagnetic wave emitted from the radar device is measured by a measurement device provided in the target, or a reflected wave of the electromagnetic wave from the target is detected by the radar device to understand a deviation of an optical axis of the radar device with respect to a normal direction, and the optical axis of the radar device is adjusted so that the deviation disappears.

Japanese Unexamined Patent Application, Publication No. 2005-331353 discloses a positioning device that automatically determines a position of the target. In the positioning device, a plan-view image of a vehicle is photographed by a camera, the normal direction of the optical axis of the radar device is specified on the basis of the plan-view image, and the target is moved to a position at which the specified normal direction and a surface of the target are orthogonal to each other.

SUMMARY OF THE INVENTION

However, when attaching the radar device to the vehicle body, not a little assembly errors occur. The assembly errors include not only the deviation of the optical axis direction of the radar device as described above but also a deviation of an attachment position of the radar device. However, in the positioning device disclosed in Japanese Unexamined Patent Application, Publication No. 2005-331353, a normal direction of the optical axis of the radar device is specified from the plan-view image of the vehicle, and thus an actual attachment position of the radar device or an optical axis direction is not detected. This corresponds to specifying of the normal direction of the optical axis on the assumption that the radar device is attached to an appropriate position of the vehicle. That is, according to the positioning device disclosed in Japanese Unexamined Patent Application, Publication No. 2005-331353, a position of the target is determined without considering the deviation of the attachment position of the radar device. Therefore, even when adjusting the optical axis of the radar device by using the target of which a position is determined by the positioning device of Japanese Unexamined Patent Application, Publication No. 2005-331353, the optical axis is apt to deviate from an original normal direction in an amount corresponding to the deviation of the attachment position of the radar device.

A detection error of the radar device which is caused by the deviation of the optical axis increases as a distance between an object and the radar device is longer. In recent years, it has been required that a position of an object can be detected by a radar device with accuracy up to sufficiently far away position, and thus there is a concern that it is difficult to adjust the optical axis of the radar device to a certain extent capable of realizing required accuracy in the positioning device of the related art.

An object of the invention is to provide a sensor axis adjustment system and a sensor axis adjustment method which are capable of appropriately installing an adjustment target to adjust a sensor axis of an external environment sensor with accuracy.

(1) According to an aspect of the invention, there is provided a sensor axis adjustment system (for example, an optical axis adjustment system 3 to be described later) that adjusts a sensor axis (for example, an optical axis O to be described later) of an external environment sensor in a vehicle (for example, a vehicle V to be described later) in which the external environment sensor (for example, a radar device R to be described later) that detects an external environment is attached to a vehicle body (for example, a vehicle body B to be described later). The sensor axis adjustment system includes: an adjustment target (for example, an adjustment target T to be described later) of the sensor axis; a position and direction calculation unit (for example, a radar attachment position and direction calculation unit 65 to be described later) that calculates an attachment position of the external environment sensor and a direction of the sensor axis; a normal posture calculation unit (for example, a normal posture calculation unit 66 to be described later) that calculates a normal posture of the adjustment target with respect to the vehicle body on the basis of a calculation result of the position and direction calculation unit; and a movement unit (for example, a target movement unit 67 to be described later) that moves at least one of the adjustment target and the vehicle body so that a posture of the adjustment target with respect to the vehicle body becomes the normal posture.

(2) In this case, the normal posture calculation unit may calculate the normal posture so that a surface of the adjustment target becomes orthogonal to a normal sensor axis (for example, a normal optical axis On to be described later) that connects a longest target detection point (for example, a longest target detection point Pm to be described later) of the external environment sensor and the attachment position.

(3) According to another aspect of the invention, there is provided a sensor axis adjustment method (for example, an aiming process to be described later) of adjusting a sensor axis (for example, an optical axis O to be described later) of an external environment sensor in a vehicle (for example, a vehicle V to be described later) in which the external environment sensor (for example, a radar device R to be described later) that detects an external environment is attached to a vehicle body (for example, a vehicle body B to be described later). The sensor axis adjustment method includes: a process of calculating an attachment position of the external environment sensor and a direction of the sensor axis (for example, S12 to S15 in FIG. 8 to be described later); a process of calculating a normal posture of an adjustment target (for example, an adjustment target T to be described later) of the sensor axis with respect to the vehicle body on the basis of the attachment position and the direction of the sensor axis which are calculated (for example, S17 in FIG. 8 to be described later); a process of moving at least one of the adjustment target and the vehicle body so that a posture of the adjustment target with respect to the vehicle body becomes the normal posture (for example, S18 in FIG. 8 to be described later); and a process of adjusting a direction of the sensor axis by using the adjustment target (for example, S19 in FIG. 8 to be described later).

(1) In the sensor axis adjustment system of the invention, the position and direction calculation unit calculates the attachment position of the external environment sensor attached to the vehicle body and a direction of the sensor axis, the normal posture calculation unit calculates the normal posture of the adjustment target with respect to the vehicle body on the basis of the calculation result of the position and direction calculation unit, and the movement unit moves at least one of the adjustment target and the vehicle body so that a posture of the adjustment target becomes the normal posture. As described above, in the invention, the normal posture of the adjustment target with respect to the vehicle body is calculated on the basis of the calculation result of the position and direction calculation unit. Accordingly, it is possible to set a posture of the adjustment target with respect to the vehicle body to an appropriate posture in correspondence with the attachment position of the external environment sensor and the direction of the sensor axis in which not a little deviation occurs for every vehicle. In addition, the posture of the adjustment target with respect to the vehicle body is set to the normal posture, and thus it is possible to adjust the sensor axis of the external environment sensor with accuracy.

In addition, a detection error of the external environment sensor due to a deviation of the sensor axis increases as a distance between the object and the external environment sensor is longer. Therefore, it is possible to adjust the sensor axis with accuracy as a distance between an inspection target and the vehicle body is longer, but it is necessary to secure a wide inspection area to lengthen an interval between the adjustment target and the external environment sensor. In contrast, in the invention, as described above, the posture of the adjustment target with respect to the vehicle body is set to the normal posture, and thus it is possible to shorten the interval between the adjustment target and the vehicle body while securing sufficient adjustment accuracy of the sensor axis. Accordingly, according to the sensor axis adjustment system of the invention, it is possible to make the inspection area compact while adjusting the sensor axis with accuracy.

(2) In the invention, the normal posture calculation unit calculates the normal posture of the adjustment target so that the surface of the adjustment target becomes orthogonal to the normal sensor axis that connects the longest target detection point of the external environment sensor and the attachment position. Here, the longest target detection point corresponds to an upper limit of the distance between the external environment sensor and an object at which detection by the external environment sensor can be performed with predetermined accuracy. According to the invention, the normal posture of the adjustment target with respect to the vehicle body is calculated so that the surface of the adjustment target becomes orthogonal to the normal sensor axis that connects the longest target detection point of the external environment sensor and the attachment position, and the posture of the adjustment target with respect to the vehicle body is set to the normal posture. Accordingly, it is possible to adjust the sensor axis so that an object at the longest target detection point can be detected with predetermined accuracy.

(3) In the sensor axis adjustment method of the invention, the attachment position of the external environment sensor and the direction of the sensor axis are calculated, the normal posture of the adjustment target with respect to the vehicle body is calculated on the basis of the calculation result of the attachment position and the direction of the sensor axis, at least one of the adjustment target and the vehicle body is moved so that a posture of the adjustment target with respect to the vehicle body becomes the normal posture, and the direction of the sensor axis is adjusted by using the adjustment target. According to this, it is possible to install the adjustment target in an appropriate posture corresponding to an actual attachment position of the external environment sensor and an actual direction of the sensor axis, and it is possible to adjust the sensor axis of the external environment sensor with accuracy.

DETAILED DESCRIPTION OF THE INVENTION

Hereinafter, a configuration of a vehicle inspection system S according to an embodiment of the invention will be described in detail with reference to the accompanying drawings.

Figure 1:
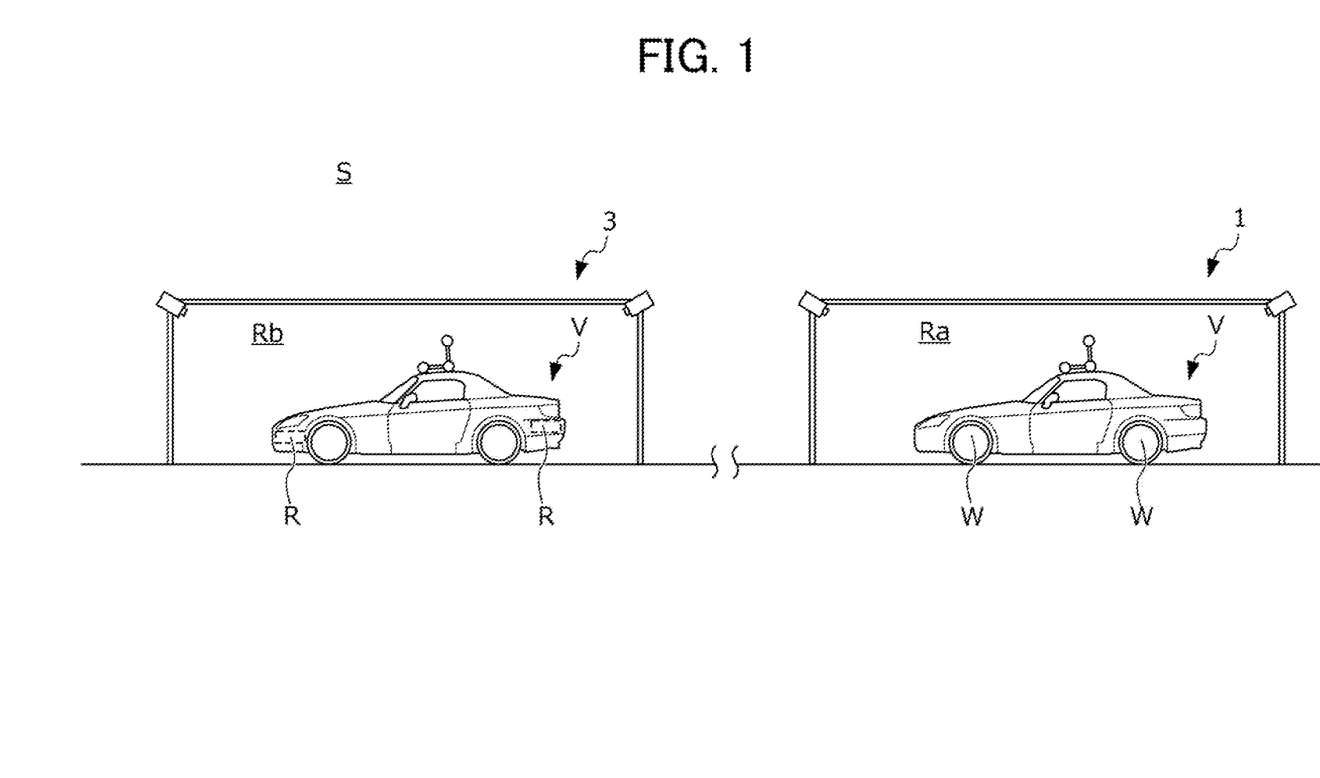
FIG. 1 is a view schematically illustrating a configuration of a vehicle inspection system according to an embodiment of the invention.

FIG. 1 is a view schematically illustrating a configuration of the vehicle inspection system S. The vehicle inspection system S is a facility that is used when inspecting a vehicle V to which a plurality of radar devices R are attached as an external environment sensor that detects an external environment. FIG. 1 illustrates configurations of an alignment system 1 and an optical axis adjustment system 3 which are facilities used when executing, particularly, an alignment tester process and an aiming process among a plurality of inspection processes on the vehicle V by using the vehicle inspection system S.

Figure 2A:
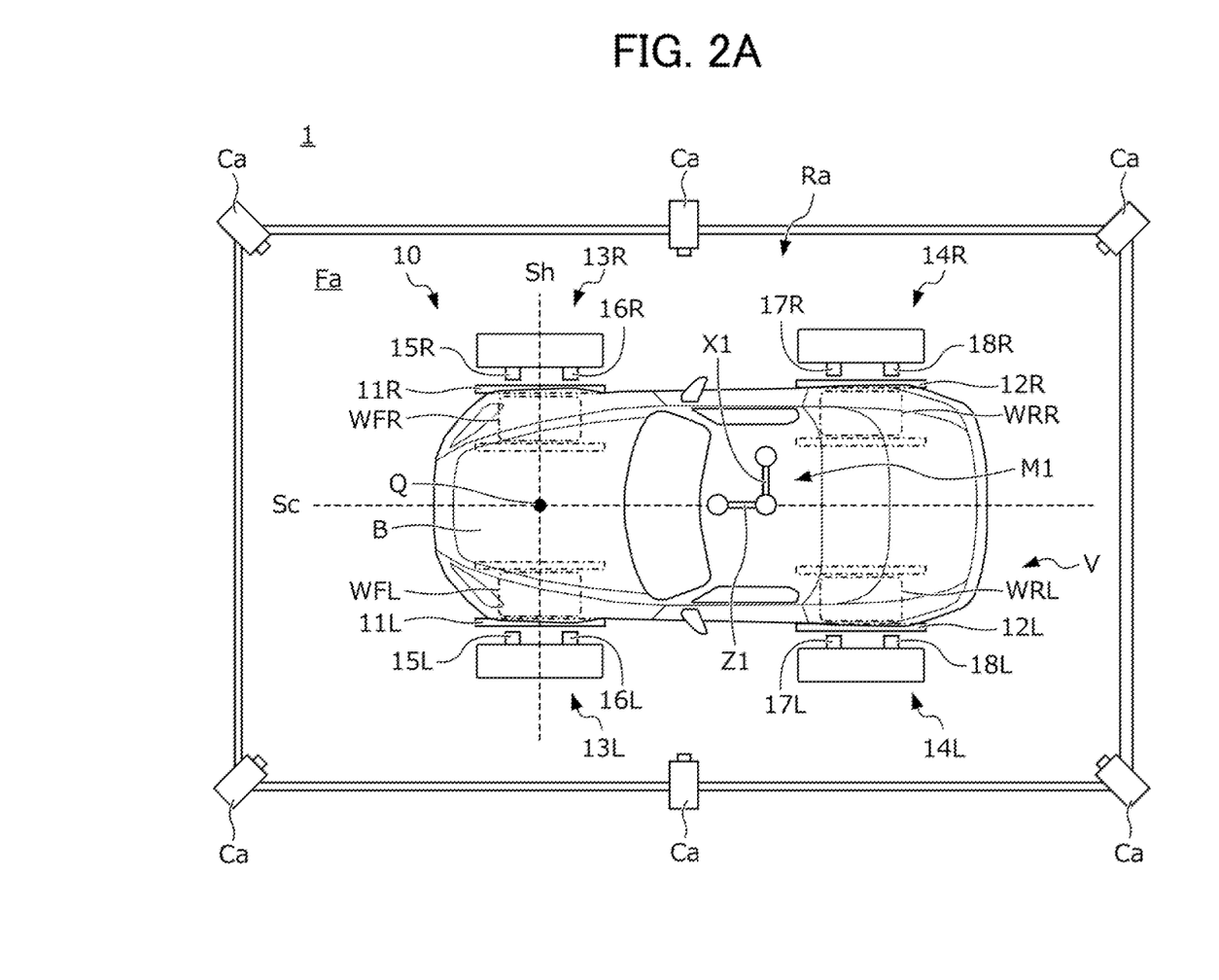
FIG. 2A is a plan view of an alignment system.
Figure 2B:
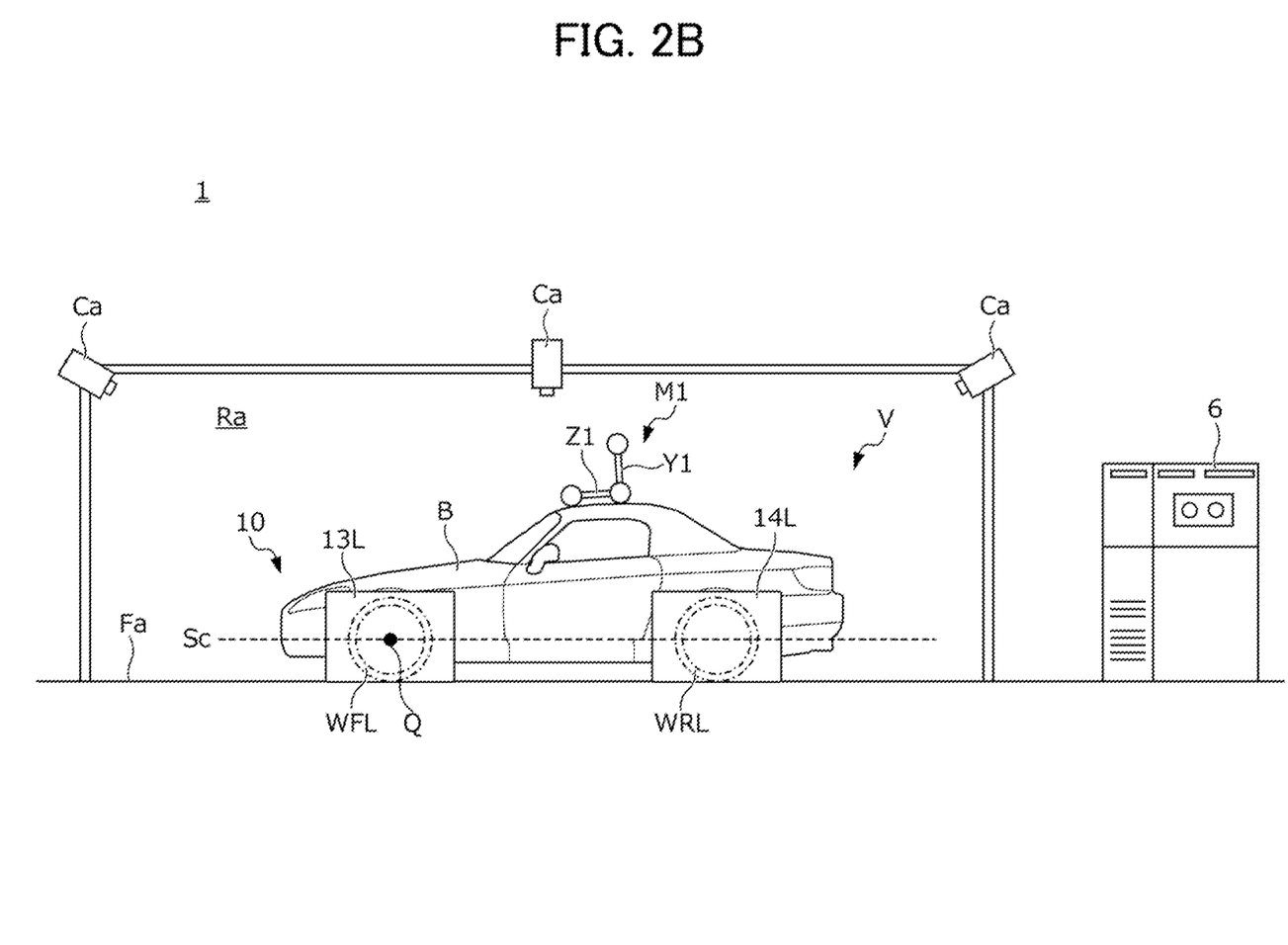
FIG. 2B is a side view of the alignment system.
Figure 4A:
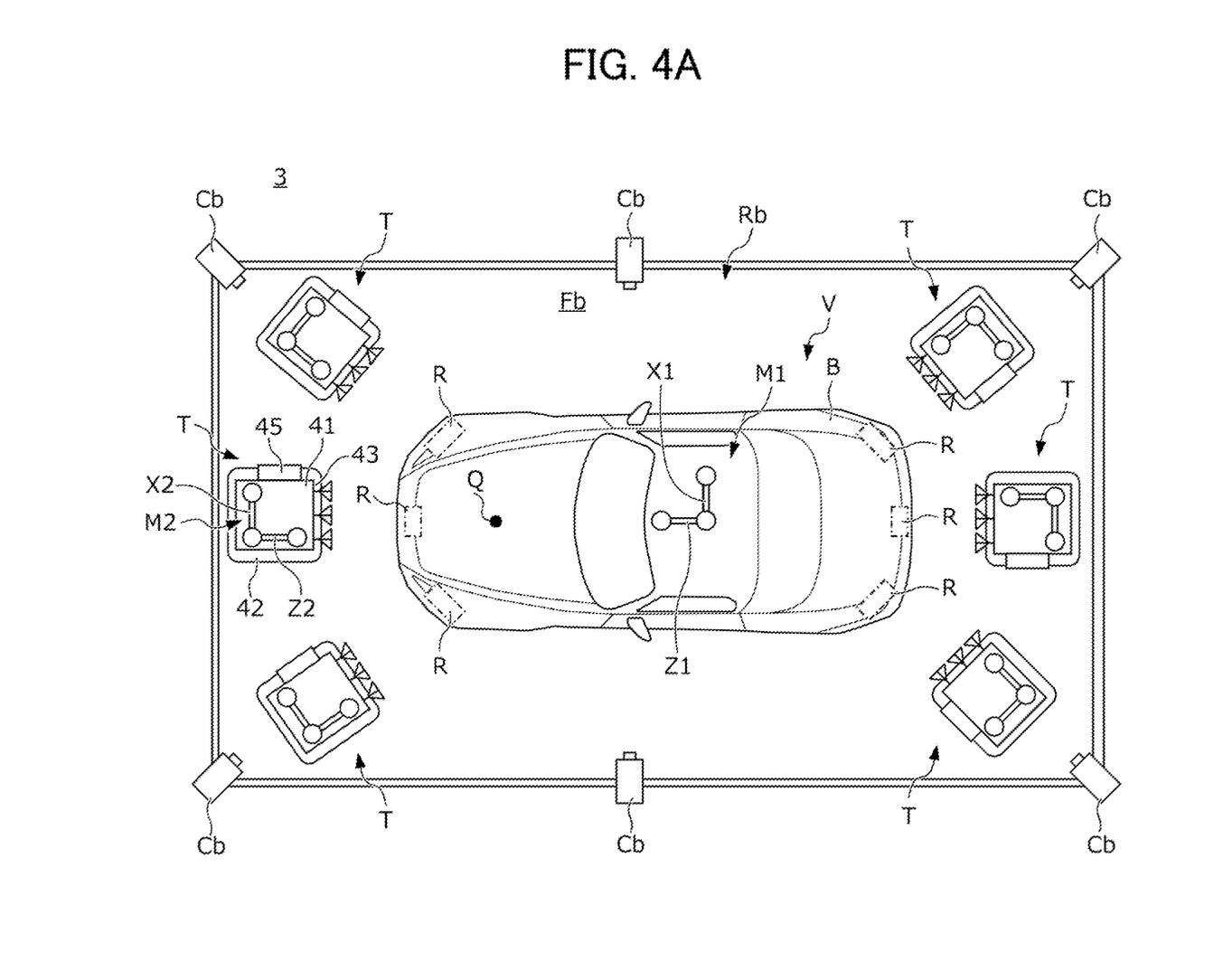
FIG. 4A is a plan view of an optical axis adjustment system.
Figure 4B:
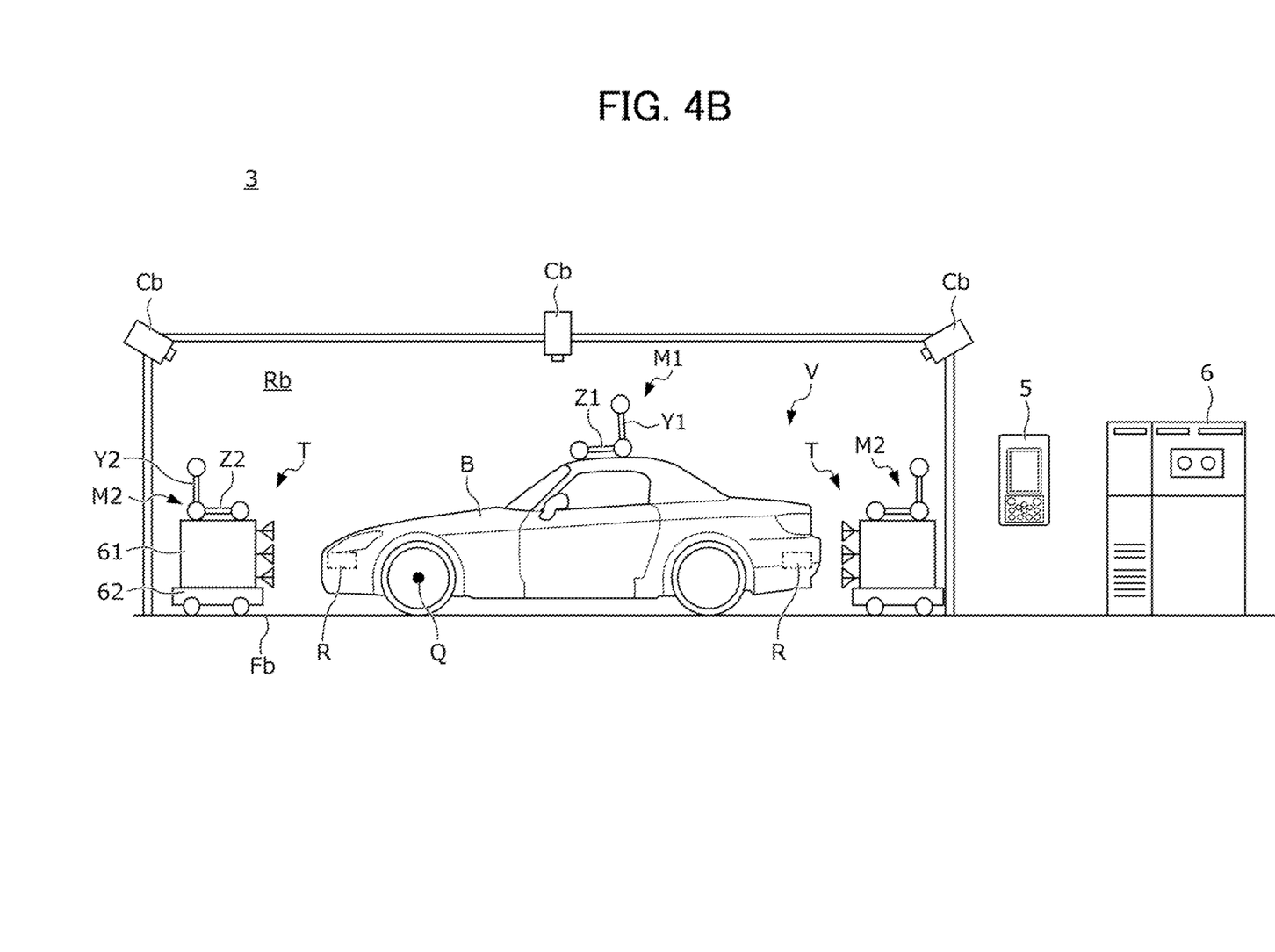
FIG. 4B is a side view of the optical axis adjustment system.

In the alignment tester process, an attachment angle, an attachment position, and the like of wheels W, which are movable components attached to a vehicle body of the vehicle V, with respect to an axle are adjusted in an inspection chamber Ra in which the alignment system 1 to be described later with reference to FIG. 2A and FIG. 2B is installed. In the aiming process, a direction of an optical axis of each of the radar devices R with respect to the vehicle V after being subjected to the alignment tester process is adjusted in an inspection chamber Rb in which the optical axis adjustment system 3 to be described later with reference to FIG. 4A and FIG. 4B is installed.

Hereinafter, detailed configurations of the alignment system 1 and the optical axis adjustment system 3 will be sequentially described with reference to the accompanying drawings.

FIG. 2A is a plan view of the alignment system 1, and FIG. 2B is a side view of the alignment system 1.

The alignment system 1 includes an alignment measurement device 10 installed on a floor surface Fa of the inspection chamber Ra, a plurality of (for example, six) cameras Ca which are installed on the ceiling of the inspection chamber Ra, and a control device 6 that processes an image captured by the cameras Ca.

The alignment measurement device 10 includes front wheel guides 11L and 11R and rear wheel guides 12L and 12R which are installed on the floor surface Fa, front housings 13L and 13R which are installed on an outer side of the front wheel guides 11L and 11R in a vehicle width direction, and rear housings 14L and 14R which are installed on an outer side of the rear wheel guides 12L and 12R in the vehicle width direction.

The vehicle V is stopped at a defined position in the inspection chamber Ra by advancing front wheels WFL and WFR, and rear wheels WRL and WRR along the front wheel guides 11L and 11R and the rear wheel guides 12L and 12R.

The front housings 13L and 13R are respectively provided with front wheel confronting devices 15L and 15R and front wheel sensors 16L and 16R, and the rear housings 14L and 14R are respectively provided with rear wheel confronting devices 17L and 17R and rear wheel sensors 18L and 18R.

The front wheel sensors 16L and 16R and the rear wheel sensors 18L and 18R respectively measure a toe angle, a caster angle, or the like of the front wheels WFL and WFR and the rear wheels WRL and WRR. The front wheel confronting devices 15L and 15R respectively press the front wheels WFL and WFR to set a position of a front portion of a vehicle body B to a defined position. The rear wheel confronting devices 17L and 17R respectively press the rear wheels WRL and WRR to set a position of a rear portion of the vehicle body B to a defined position. Note that, in the following description, a posture of the vehicle body B, which is realized in the inspection chamber Ra by using the front wheel confronting devices 15L and 15R and the rear wheel confronting devices 17L and 17R, is referred to as a confronting posture. In addition, in a state in which the confronting posture is secured by the confronting devices 15L, 15R, 17L, and 17R, a position and a posture of an axle Sh of the front wheels WFL and WFR in the inspection chamber Ra are fixed, and thus the position and the posture can be specified with accuracy. Here, in the following description, an inspection reference point Q is defined to the center of the axle Sh, that is, an intersection between the axle Sh and a vehicle body central axis Sc that extends along a front and rear direction at a vehicle width direction center of the vehicle body B.

A first marker M1 is attached to a roof panel that is an upper portion of the vehicle body B. The first marker M1 has a predetermined three-dimensional shape. More specifically, the first marker M1 is constructed by attaching four spherical reflection markers to ends of three axis bodies X1, Y1, and Z1 which are orthogonal to each other. The first marker M1 is attached to the roof panel of the vehicle body B with a tape (not illustrated) so that the axis body X1 becomes approximately parallel to a vehicle width direction of the vehicle body B, the axis body Y1 becomes approximately to a vertical direction of the vehicle body B, and the axis body Z1 becomes approximately parallel to an advancing direction of the vehicle body B.

The six cameras Ca are installed with predetermined intervals at ceiling side portions of side walls which partition the inspection chamber Ra to surround the vehicle body B in a state in which a confronting posture is secured by the confronting devices 15L, 15R, 17L, and 17R. The cameras Ca photograph the vehicle body B and the first marker M1 attached to the roof panel in a state in which the confronting posture is secured in correspondence with a command from the control device 6, and transmits image data obtained through the photographing to the control device 6. The control device 6 calculates a position and a posture of the first marker M1 with reference to the inspection reference point Q of the vehicle body B by using the image data obtained by the cameras Ca as to be described later with reference to FIG. 5.

Figure 3:
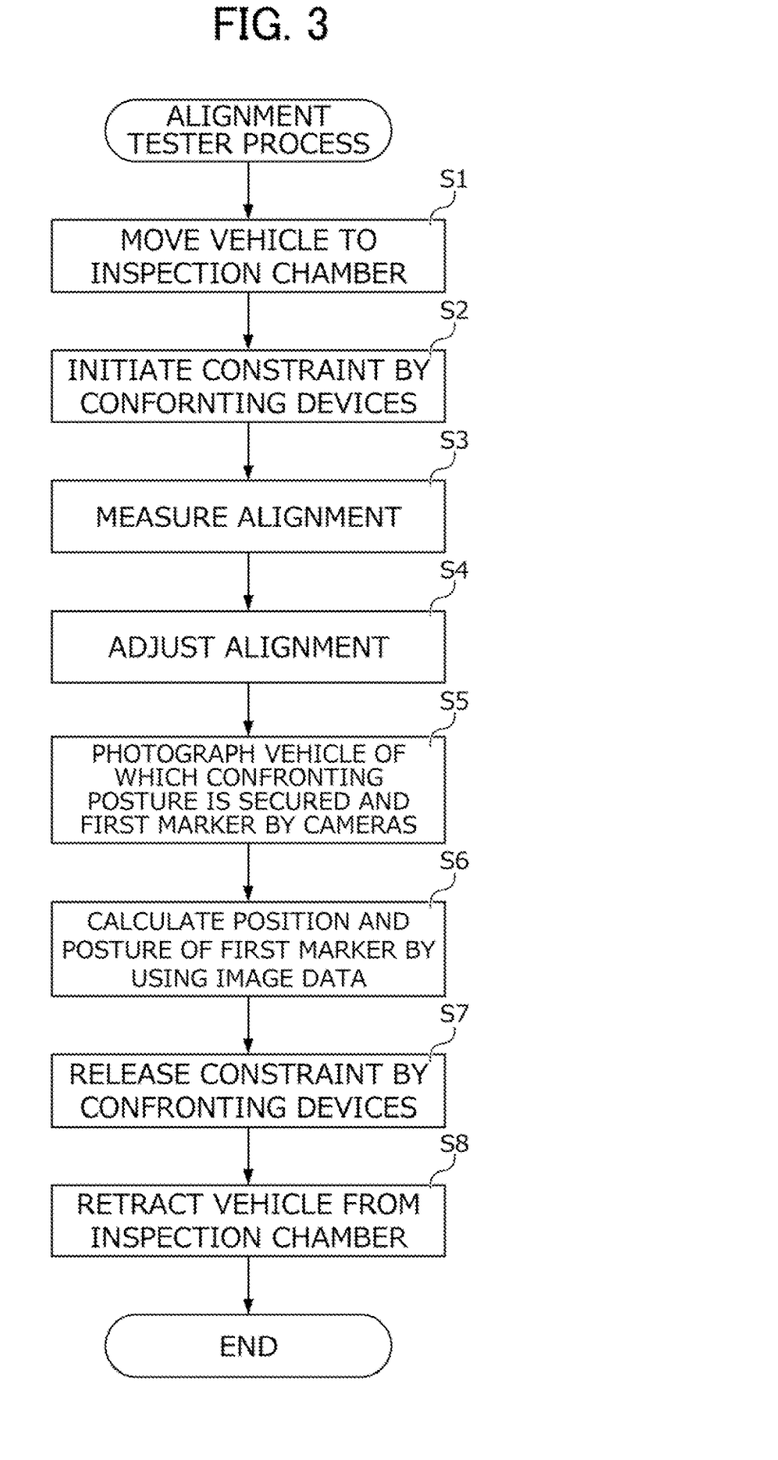
FIG. 3 is a flowchart illustrating a specific procedure of an alignment tester process using the alignment system.

FIG. 3 is a flowchart illustrating a specific procedure of an alignment tester process using the alignment system 1 as described above.

First, in S1, an operator moves the vehicle V to which the first marker M1 is attached in advance to the inspection chamber Ra in which the alignment system 1 is installed. In S2, the operator initiates constraint of the vehicle body B by the confronting devices 15L, 15R, 17L, and 17R. Then, the vehicle body B is maintained in the confronting posture until the constraint by the confronting devices 15L, 15R, 17L, and 17R is released. In S3, the operator measures alignment by using the alignment measurement device 10, and adjusts the alignment in S4 by using a measurement result in S3.

In S5, the operator photographs the vehicle body B and the first marker M1 after alignment adjustment by using the six cameras Ca. In S6, the control device 6 calculates a position and a posture of the first marker M1 with reference to the inspection reference of the vehicle body B by using image data obtained by the six cameras Ca. In S7, the operator releases the constraint of the vehicle body B by the confronting devices 15L, 15R, 17L, and 17R. In S8, the operator retracts the vehicle V from the inspection chamber Ra.

FIG. 4A is a plan view of the optical axis adjustment system 3, and FIG. 4B is a side view of the optical axis adjustment system 3.

The vehicle V of which the alignment is adjusted by using the above-described alignment system 1 is conveyed to the optical axis adjustment system 3. Hereinafter, description will be given of a case where six radar devices R are attached to the vehicle body B of the vehicle V, and in the optical axis adjustment system 3, directions of optical axes of the six radar devices R are adjusted. As illustrated in FIG. 4A, the radar devices R are attached one by one to a central portion, a leftward portion, and a rightward portion on a front side of the vehicle body B, and a central portion, a leftward portion, and a rightward portion on a rear side of the vehicle body B.

The optical axis adjustment system 3 includes a plurality of (for example, six; the same number as in the radar devices mounted on the vehicle body B) adjustment targets T which are movable on a floor surface Fb of the inspection chamber Rb, a plurality of (for example, six) cameras Cb installed on the ceiling of the inspection chamber Rb, a control device 6 that processes an image captured by the six cameras Cb, and a vehicle inspection device 5 that can perform communication with the vehicle V. As described above, the first marker M1 is attached to the roof panel of the vehicle body B as described above.

Each of the adjustment targets T includes an electromagnetic wave characteristic measurement device 41 that measures characteristics (for example, an intensity distribution, a phase, or the like of the electromagnetic wave) of an electromagnetic wave (for example, a millimeter wave emitted from the radar devices R), and a cart 42 that support a lower portion of the electromagnetic wave characteristic measurement device 41. The electromagnetic wave characteristic measurement device 41 and the cart 42 can perform wireless communication with the control device 6.

The electromagnetic wave characteristic measurement device 41 measures an intensity distribution of an electromagnetic wave incident to an incident surface 43, and wirelessly transmits intensity distribution data that is obtained through the measurement to the control device 6. The cart 42 moves on the floor surface Fb of the inspection chamber Rb in correspondence with a command signal wirelessly transmitted from the control device 6.

In addition, a reflector 45 that reflects the electromagnetic wave emitted from the radar devices R is attached to a surface different from the incident surface 43 of the electromagnetic wave characteristic measurement device 41.

A second marker M2 is attached to a predetermined position of an upper portion of the electromagnetic wave characteristic measurement device 41. The second marker M2 has a three-dimensional shape as in the first marker M1. More specifically, the second marker M2 is constructed by attaching four spherical reflection markers to ends of three axis bodies X2, Y2, and Z2 which are orthogonal to each other. The second marker M2 is attached to an upper portion of the electromagnetic wave characteristic measurement device 41 with a tape (not illustrated) so that the axis body X2 becomes approximately parallel to the incident surface 43 of the electromagnetic wave characteristic measurement device 41, the axis body Y2 becomes approximately parallel to the vertical direction, and the axis body Z2 becomes approximately vertical to the incident surface 43.

The six cameras Cb are installed with predetermined intervals at ceiling side portions of side walls which partition the inspection chamber Rb to surround the vehicle body B installed in the inspection chamber Rb. The cameras Cb photograph the vehicle body B and the first marker M1 attached to the roof panel of the vehicle body B, and the six adjustment targets T and the second markers M2 attached to defined positions of upper portions of the adjustment targets T, and transmits image data obtained through the photographing to the control device 6.

The vehicle inspection device 5 is connected to a vehicle ECU (not illustrated) mounted on the vehicle body B through a communication line, and can perform communication with the vehicle ECU. The vehicle ECU emits an electromagnetic wave (for example, a millimeter wave) from the radar devices R mounted on the vehicle body B or adjusts a direction of an optical axis of each of the radar devices R in correspondence with a command signal transmitted from the vehicle inspection device 5.

Figure 5:
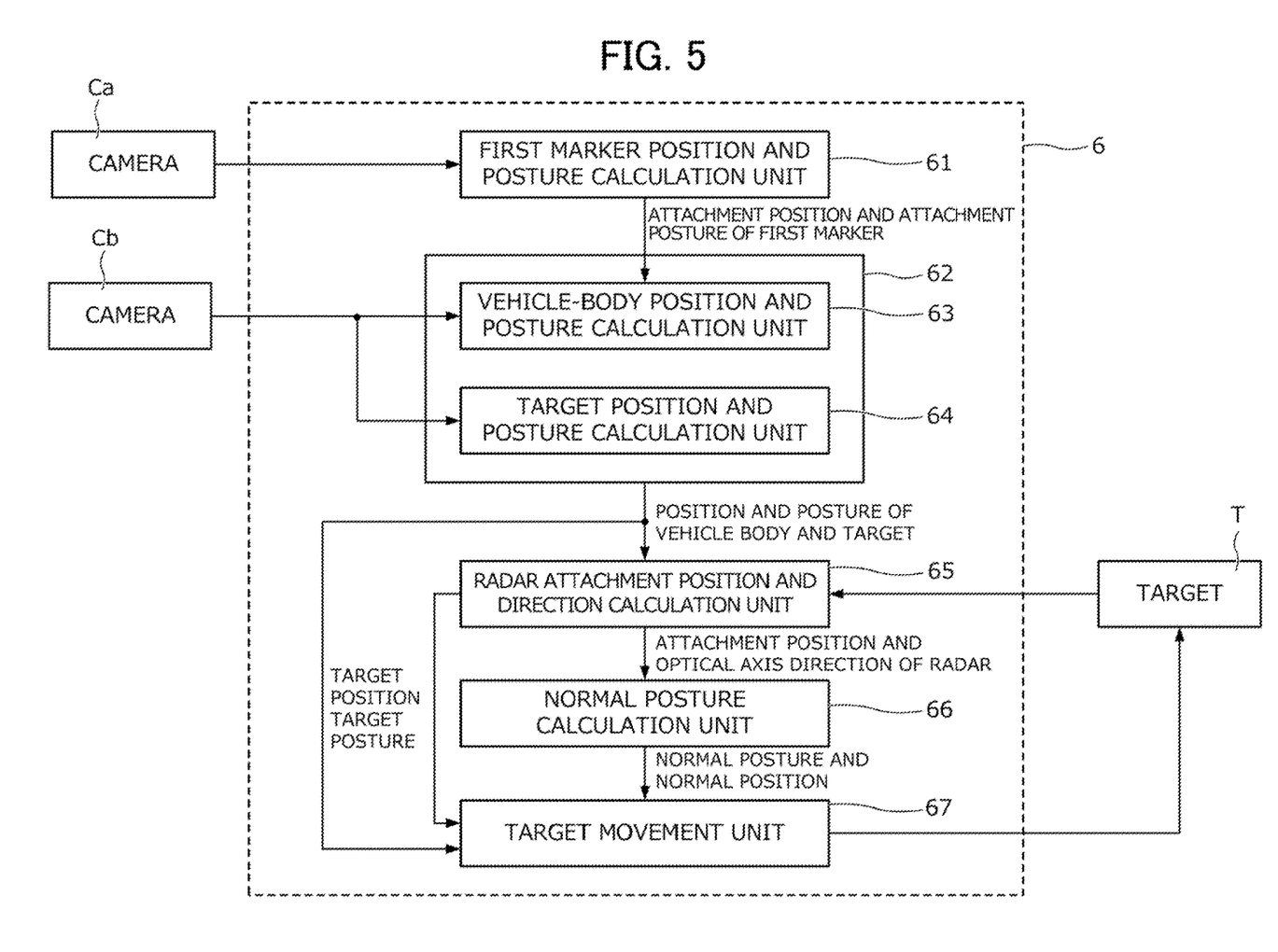
FIG. 5 is a functional block diagram of a control device.

FIG. 5 is a functional block diagram of the control device 6. The control device 6 is a computer including a CPU, a ROM, a RAM, a wireless communication interface, and the like. The control device 6 functions as a first marker position and posture calculation unit 61, a position and posture calculation unit 62, a radar attachment position and direction calculation unit 65, a normal posture calculation unit 66, and a target movement unit 67 to be described later by executing various kinds of operation processing in the CPU in accordance with a program stored in the ROM.

The first marker position and posture calculation unit 61 calculates a position and a posture of the first marker M1 with reference to the inspection reference point Q defined on the axle Sh of the vehicle body B in a state of securing the confronting posture by the confronting devices 15L, 15R, 17L, and 17R by using image data transmitted from the six cameras Ca in the alignment tester process described with reference to FIG. 3. As described above, an attachment position or an attachment posture of the first marker M1 in the vehicle body B is slightly different for every vehicle V. Accordingly, the first marker position and posture calculation unit 61 calculates the position and the posture of the first marker M1 with reference to the inspection reference point Q in a state of securing the confronting posture for every vehicle V.

The position and posture calculation unit 62 includes a vehicle-body position and posture calculation unit 63 and a target position and posture calculation unit 64, and calculates a position and a posture of the vehicle body B and the adjustment targets T in the inspection chamber Rb by using the units.

The vehicle-body position and posture calculation unit 63 calculates a position and a posture of the vehicle body B in the inspection chamber Rb by using the image data transmitted from the six camera Cb installed in the inspection chamber Rb, and the position and the posture of the first marker M1 with reference to the inspection reference point Q which are calculated by the first marker position and posture calculation unit 61. More specifically, the vehicle-body position and posture calculation unit 63 detects the position and the posture of the first marker M1 in the inspection chamber Rb by using the image data transmitted from the six cameras Cb, and calculates the position and the posture of the vehicle body B in the inspection chamber Rb by using the detection result of the position and the posture of the first marker M1 and the calculation result of the first marker position and posture calculation unit 61. The position and the posture of the vehicle body B which are calculated by the vehicle-body position and posture calculation unit 63 are transmitted to the radar attachment position and direction calculation unit 65, the normal posture calculation unit 66, and the target movement unit 67.

The target position and posture calculation unit 64 calculates a position and a posture of the six adjustment targets T in the inspection chamber Rb by using the image data transmitted from the six cameras Cb installed in the inspection chamber Rb. The above-described second marker M2 is attached at a predetermined position of each of the adjustment targets T, and information relating to an attachment position and an attachment posture of the second marker M2 is stored in the target position and posture calculation unit 64. The target position and posture calculation unit 64 detects the position and the posture of the second marker M2 of the adjustment target T in the inspection chamber Rb by using the image data transmitted from the six cameras Cb, and calculates the position and the posture of the adjustment target T in the inspection chamber Rb by using the calculation result of the position and the posture of the second marker M2, and the information relating to the predetermined attachment position and attachment posture of the second marker M2. The position and the posture of the vehicle body B which are calculated by the target position and posture calculation unit 64 is transmitted to the radar attachment position and direction calculation unit 65, the normal posture calculation unit 66, and the target movement unit 67.

The target movement unit 67 moves the cart 42 of the adjustment target T so that matching is established between the position and the posture of the adjustment target T which are calculated by the target position and posture calculation unit 64, and a target position and a target posture of the adjustment target T which are calculated in accordance with a procedure to be described later by the radar attachment position and direction calculation unit 65 or a normal position and a normal posture of the adjustment target T which are calculated in accordance with a procedure to be described later by the normal posture calculation unit 66.

The radar attachment position and direction calculation unit 65 calculates an attachment position of each of the radar devices R attached to the vehicle body B and a direction of an optical axis of the radar device R by using the position and the posture of the vehicle body B and the adjustment target T which are calculated by the position and posture calculation unit 62, and the intensity distribution data transmitted from the electromagnetic wave characteristic measurement device 41 provided in the adjustment target T.

Figure 6:
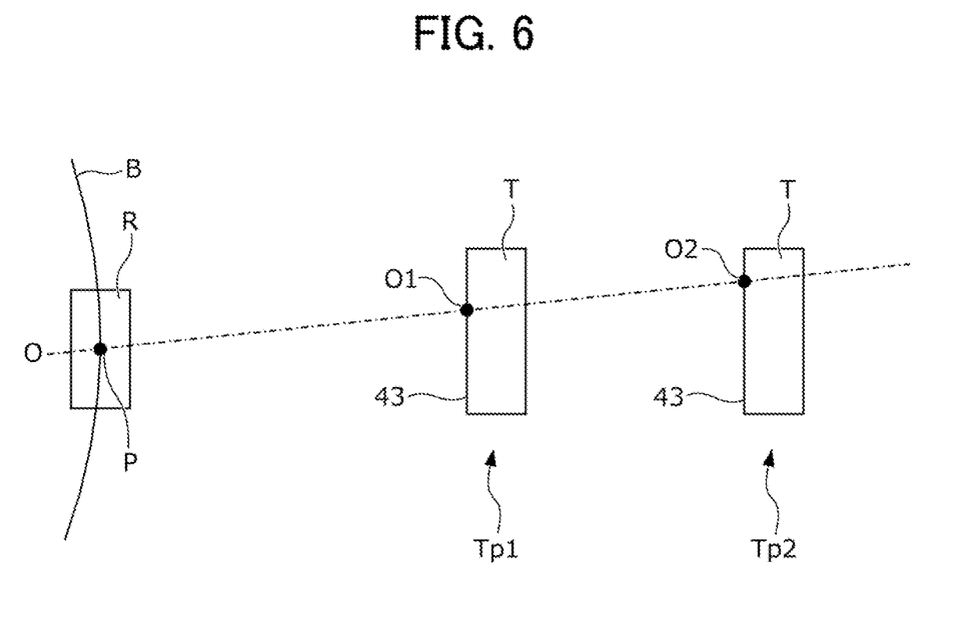
FIG. 6 is a view illustrating a procedure of calculating an attachment position of a radar device and a direction of an optical axis in a radar attachment position and direction calculation unit.

FIG. 6 is a view illustrating a procedure of calculating a position of an attachment point P of the radar device R and a direction of an optical axis O in the radar attachment position and direction calculation unit 65.

As illustrated in FIG. 6, the radar attachment position and direction calculation unit 65 changes a position of the adjustment target T between a first position Tp1 and a second position Tp2 that is further distant from the vehicle body B in comparison to the first position Tp1, and calculates a position of the attachment point P of the radar device R with respect to the vehicle body B in a three-dimensional space and a direction of the optical axis O in a three-dimensional space by using the intensity distribution data of the electromagnetic wave of the radar device R which is obtained by the adjustment target T installed at the positions Tp1 and Tp2.

More specifically, the radar attachment position and direction calculation unit 65 sets a target position of the adjustment target T to the first position Tp1, moves the adjustment target T to the first position Tp1 by using the target movement unit 67, and calculates a position of a point at which an electromagnetic wave intensity becomes the maximum from the intensity distribution data obtained by the adjustment target T. As described above, the position of the point at which the electromagnetic wave intensity calculated by the radar attachment position and direction calculation unit 65 becomes the maximum corresponds to an intersection O1 between the optical axis O and the incident surface 43 of the adjustment target T installed at the first position Tp1.

In addition, the radar attachment position and direction calculation unit 65 sets the target position of the adjustment target T to the second position Tp2, moves the adjustment target T to the second position Tp2 by using the target movement unit 67, and calculates a position of a point at which the electromagnetic wave intensity becomes the maximum from the intensity distribution data obtained by the adjustment target T. As described above, the position of the point at which the electromagnetic wave intensity calculated by the radar attachment position and direction calculation unit 65 becomes the maximum corresponds to an intersection O2 between the optical axis O and the incident surface 43 of the adjustment target T installed at the second position Tp2.

As described above, the radar attachment position and direction calculation unit 65 calculates a direction of the optical axis O as a line segment passing through the two intersections O1 and O2 by using the positions of the two intersections O1 and O2. In addition, the radar attachment position and direction calculation unit 65 calculates a position of the attachment point P of the radar device R in a three-dimensional space by an intersection between an extension line of the line segment passing through the intersections O1 and O2 calculated as described above, and the vehicle body B. As described above, the radar attachment position and direction calculation unit 65 calculates the position of the attachment point P of the radar device R attached to the vehicle body B in a three-dimensional space, and a direction of the optical axis O in a three-dimensional space.

Returning to FIG. 5, the normal posture calculation unit 66 calculates a normal position and a normal posture of the adjustment target T on the basis of the attachment position of the radar device R and the direction of the optical axis which are calculated by the radar attachment position and direction calculation unit 65. The target movement unit 67 moves the adjustment target T to be the normal position and the normal posture which are calculated by the normal posture calculation unit 66. Here, the normal position and the normal posture of the adjustment target T correspond to a position and a posture of the adjustment target T to be installed to adjust the direction of the optical axis so that the direction of the optical axis of the radar device R becomes the normal direction.

Figure 7A:
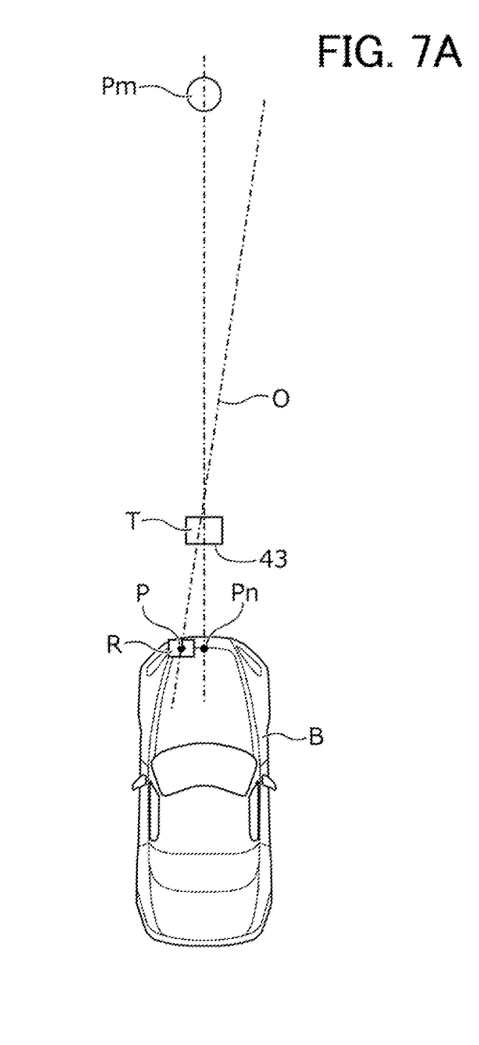
FIG. 7A is a view illustrating a procedure of calculating a normal position and a normal posture of an adjustment target in a normal posture calculation unit.
Figure 7B:
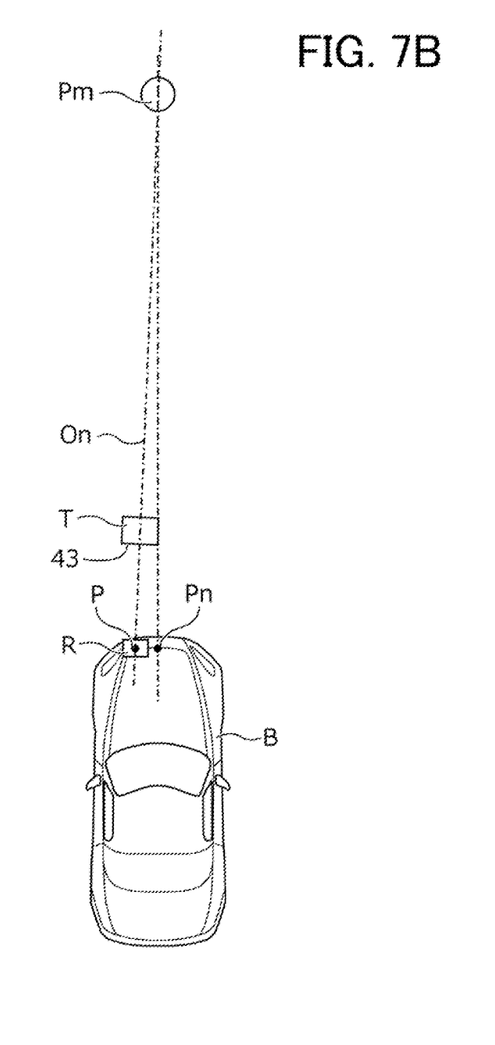
FIG. 7B is a view illustrating a procedure of calculating the normal position and the normal posture of the adjustment target in the normal posture calculation unit.

FIG. 7A and FIG. 7B are views illustrating a procedure of calculating the normal position and the normal posture of the adjustment target T in the normal posture calculation unit 66. Note that, FIG. 7A and FIG. 7B illustrate a case where the radar device R is attached to the vehicle body B at a position that extremely deviates from a designed attachment point Pn along a right and left direction for easy explanation. However, actually, the radar device R is attached at a position that deviates from the designed attachment point Pn along not only the right and left direction but also an upper and lower direction, but illustration on the deviation along the upper and lower direction will be omitted.

First, as illustrated in FIG. 7A and FIG. 7B, the longest target detection point Pm of the radar device R is set to a position that is distant from the designed attachment point Pn of the radar device R by a predetermined maximum detection distance (for example, 100 m). Note that, a position of the designed attachment point Pn in a three-dimensional space can be calculated on the basis of the position and the posture of the vehicle body B in the inspection chamber Rb which are calculated by the vehicle-body position and posture calculation unit 63. Accordingly, the position of the longest target detection point Pm in a three-dimensional space can also be calculated on the basis of the position and the posture of the vehicle body B in the inspection chamber Rb which are calculated by the vehicle-body position and posture calculation unit 63.

As illustrated in FIG. 7A, the radar device R is attached to the attachment point P that is spaced away from the designed attachment point Pn of the vehicle body B, and a direction of the optical axis O is not adjusted, and thus the optical axis O does not pass through the original longest target detection point Pm.

Therefore, the normal posture calculation unit 66 calculates a normal optical axis On that connects the attachment point P and the longest target detection point Pm by using a calculation result of the radar attachment position and direction calculation unit 65 as illustrated in FIG. 7B. In addition, the normal posture calculation unit 66 calculates a normal position and a normal posture of the adjustment target T so that the incident surface 43 of the adjustment target T becomes orthogonal to the normal optical axis On and the normal optical axis On interests the center of the incident surface 43. According to this, the normal posture calculation unit 66 can calculate the normal position and the normal posture of the adjustment target T to confront the radar device R between the radar device R attached to the attachment point P and the longest target detection point Pm.

Figure 8:
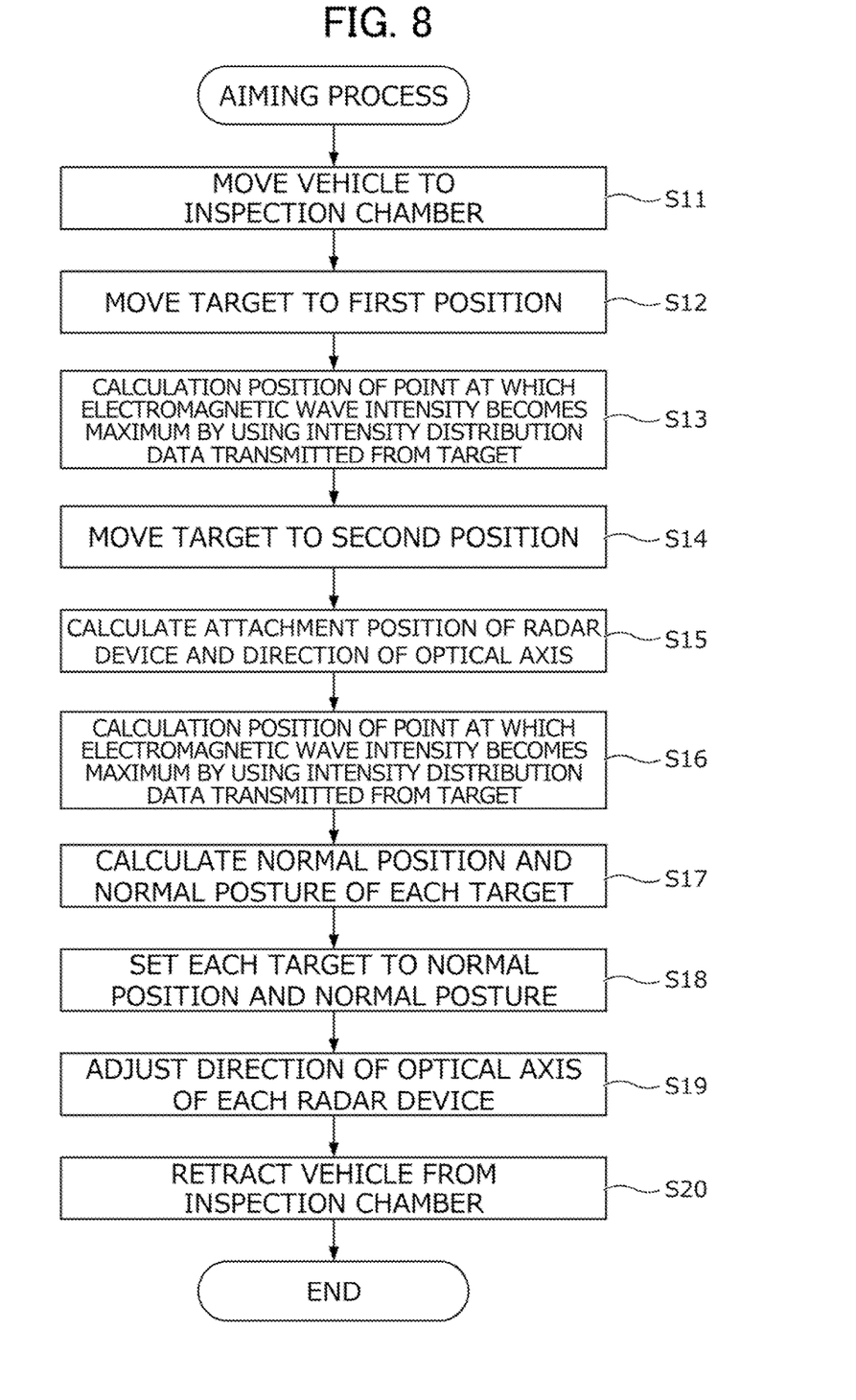
FIG. 8 is a flowchart illustrating a specific procedure of an aiming process using the optical axis adjustment system.

FIG. 8 is a flowchart illustrating a specific procedure of an aiming process using the optical axis adjustment system 3 described above.

First, in S11, the operator moves the vehicle V after being subjected to the alignment tester process in FIG. 3 to the inspection chamber Rb in which the optical axis adjustment system 3 is installed. In S12, the radar attachment position and direction calculation unit 65 of the control device 6 moves each of the adjustment targets T to the first position Tp1 determined in advance, and makes the incident surface 43 of the adjustment target T face each of the radar devices R attached to the vehicle body B. In S13, the operator operates the vehicle inspection device 5 to emit an electromagnetic wave from the radar device R and to receive the electromagnetic wave by the adjustment target T. In addition, the radar attachment position and direction calculation unit 65 calculates a position of the intersection O1 that is a point at which the electromagnetic wave intensity becomes the maximum by using the intensity distribution data transmitted from the adjustment target T.

In S14, the radar attachment position and direction calculation unit 65 moves the adjustment target T to the second position Tp2 away from the radar device R. In S15, the operator operates the vehicle inspection device 5 to emit an electromagnetic wave from the radar device R and to receive the electromagnetic wave by the adjustment target T. In addition, the radar attachment position and direction calculation unit 65 calculates a position of the intersection O2 that is a point at which the electromagnetic wave intensity becomes the maximum by using the intensity distribution data transmitted from the adjustment target T.

In S16, the radar attachment position and direction calculation unit 65 calculates a position of the attachment point P of the radar device R attached to the vehicle body B in a three-dimensional space and a direction of the optical axis O in a three-dimensional space by using positions of the two intersections O1 and O2.

In S17, the normal posture calculation unit 66 calculates a normal position and a normal posture of the adjustment target T on the basis of the position of the attachment point P of the radar device R and the direction of the optical axis O which are calculated by the radar attachment position and direction calculation unit 65.

In S18, the target movement unit 67 moves the cart 42 of the adjustment target T so that matching is established between the position and the posture of the adjustment target T which are calculated by the target position and posture calculation unit 64, and the normal position and the normal posture of the adjustment target T which are calculated by the normal posture calculation unit 66. According to this, the adjustment target T is installed at the normal position and in the normal posture which are determined in correspondence with the attachment position of the radar device R and the direction of the optical axis.

In S19, the operator adjusts the direction of the optical axis O of the radar device R by using the adjustment target T that is installed to be the normal position and the normal posture with respect to the radar device R. More specifically, an electromagnetic wave is emitted from the radar device R after the reflector T provided in the adjustment target T is made to face the radar device R, and the electromagnetic wave reflected from the reflector T is received by the radar device R. According to this, a deviation between the optical axis O of the radar device R and the normal optical axis On is understood and the direction of the optical axis O of the radar device R is adjusted so that the deviation disappears. In S20, the operator retracts the vehicle V from the inspection chamber Rb.

According to the optical axis adjustment system 3 according to this embodiment, it is possible to attain the following effects.

(1) In the optical axis adjustment system 3, the radar attachment position and direction calculation unit 65 calculates the position of the attachment point P of the radar device R attached to the vehicle body B, and the direction of the optical axis O, the normal posture calculation unit 66 calculates the normal posture of the adjustment target T on the basis of the calculation result of the radar attachment position and direction calculation unit 65, and the target movement unit 67 sets a posture of the adjustment target T to the normal posture. As described above, in the optical axis adjustment system 3, the normal posture of the adjustment target T is calculated on the basis of the calculation result of the radar attachment position and direction calculation unit 65, and thus it is possible to set the posture of the adjustment target T to an appropriate posture in correspondence with the position of the attachment point P of the radar device R and the direction of the optical axis O in which not a little deviation occurs for every vehicle V. In addition, when the adjustment target T is installed in an appropriate posture in this manner, it is possible to adjust the optical axis O of the radar device R with accuracy.

In addition, the detection error of the radar device R due to the deviation of the optical axis O increases as a distance between an object and the radar device R is longer. Therefore, it is possible to adjust the optical axis O with accuracy as a distance between an installation position of the adjustment target T and the radar device R is longer, but it is necessary to secure the wide inspection chamber Rb to lengthen an interval between the adjustment target T and the radar device R. In contrast, in the optical axis adjustment system 3, as described above, the adjustment target T is installed in an appropriate posture, and thus it is possible to shorten the interval between the adjustment target T and the radar device R while securing sufficient adjustment accuracy of the optical axis O. Accordingly, according to the optical axis adjustment system 3, it is possible to make the inspection chamber Rb compact while adjusting the optical axis O with accuracy.

(2) In the optical axis adjustment system 3, the normal posture calculation unit 66 calculates the normal posture of the adjustment target T so that the incident surface 43 of the adjustment target T becomes orthogonal to the normal optical axis On that connects the longest target detection point Pm of the radar device R and the attachment point P.

According to the optical axis adjustment system 3, the normal posture of the adjustment target T is calculated so that the incident surface 43 of the adjustment target T becomes orthogonal to the normal optical axis On that connects the longest target detection point Pm of the radar device R and the attachment point P, and a posture of the adjustment target T is set to the normal posture. According to this, it is possible to adjust the optical axis O so that an object at the longest target detection point Pm can be detected with predetermined accuracy.

Hereinbefore, an embodiment of the invention has been described, but the invention is not limited thereto. A detailed configuration may be appropriately modified in a range of the gist of the invention. For example, in the aiming process according to the embodiment, description has been given of a case where a position of the vehicle body B in the inspection chamber Rb is fixed, and the adjustment target T is moved, but the invention is not limited thereto. In the aiming process, the vehicle body B may be moved instead of moving the adjustment target T, and both the adjustment target T and the vehicle body B may be moved.

EXPLANATION OF REFERENCE NUMERALS

S VEHICLE INSPECTION SYSTEM
1 ALIGNMENT SYSTEM
Ra INSPECTION CHAMBER
Ca CAMERA
15L, 15R, 17L, 17R CONFRONTING DEVICE
3 OPTICAL AXIS ADJUSTMENT SYSTEM (SENSOR AXIS ADJUSTMENT DEVICE)
Rb INSPECTION CHAMBER
Cb CAMERA
VEHICLE
B VEHICLE BODY
Q INSPECTION REFERENCE POINT
R RADAR DEVICE (EXTERNAL ENVIRONMENT SENSOR)
Pm LONGEST TARGET DETECTION POINT
P ATTACHMENT POINT
O OPTICAL AXIS (SENSOR AXIS)
On NORMAL OPTICAL AXIS (NORMAL SENSOR AXIS)
T ADJUSTMENT TARGET
M1 FIRST MARKER
M2 SECOND MARKER
6 CONTROL DEVICE
61 FIRST MARKER POSITION AND POSTURE CALCULATION UNIT
62 POSITION AND POSTURE CALCULATION UNIT
63 VEHICLE-BODY POSITION AND POSTURE CALCULATION UNIT
64 TARGET POSITION AND POSTURE CALCULATION UNIT
65 RADAR ATTACHMENT POSITION AND DIRECTION CALCULATION UNIT (POSITION AND DIRECTION CALCULATION UNIT)
66 NORMAL POSTURE CALCULATION UNIT
67 TARGET MOVEMENT UNIT (MOVEMENT UNIT)

What is claimed is:

1. A sensor axis adjustment system that adjusts a sensor axis of an external environment sensor in a vehicle in which the external environment sensor that detects an external environment is attached to a vehicle body, the sensor axis adjustment system comprising:
an adjustment target of the sensor axis;
a position and direction calculation unit that calculates an attachment position of the external environment sensor and a direction of the sensor axis;
a normal posture calculation unit that calculates a normal posture of the adjustment target with respect to the vehicle body on the basis of a calculation result of the position and direction calculation unit; and
a movement unit that moves at least one of the adjustment target and the vehicle body so that a posture of the adjustment target with respect to the vehicle body becomes the normal posture,
wherein the adjustment target is equipped with a measurement device that measures characteristics of an electromagnetic wave incident to an incident surface of the adjustment target, and
wherein the position and direction calculation unit calculates the attachment position of the external environment sensor and the direction of the sensor axis based on a first measurement result by the measurement device when the adjustment target is positioned in a first position and a second measurement result by the measurement device when the adjustment target is positioned in a second position, the second position being farther from the vehicle body than the first position.

2. The sensor axis adjustment system according to claim 1, wherein the normal posture calculation unit calculates the normal posture so that the incident surface of the adjustment target becomes orthogonal to a normal sensor axis that connects a longest target detection point of the external environment sensor and the attachment position.

3. A sensor axis adjustment method of adjusting a sensor axis of an external environment sensor in a vehicle in which the external environment sensor that detects an external environment is attached to a vehicle body, the sensor axis adjustment method comprising:
calculating an attachment position of the external environment sensor and a direction of the sensor axis using an adjustment target of the sensor axis which is equipped with a measurement device that measures characteristics of an electromagnetic wave incident to an incident surface of the adjustment target, and by calculating the attachment position of the external environment sensor and the direction of the sensor axis based on a first measurement result by the measurement device when the adjustment target is positioned in a first position and a second measurement result by the measurement device when the adjustment target is positioned in a second position, the second position being farther from the vehicle body than the first position;
calculating a normal posture of the adjustment target of the sensor axis with respect to the vehicle body on the basis of the attachment position and the direction of the sensor axis which are calculated;
moving at least one of the adjustment target and the vehicle body so that a posture of the adjustment target with respect to the vehicle body becomes the normal posture; and
adjusting a direction of the sensor axis by using the adjustment target.

* * * * *